United States Patent [19]
Kammermeier

[11] Patent Number: 5,829,926
[45] Date of Patent: Nov. 3, 1998

[54] ROTARY TOOL, IN PARTICULAR A DRILL

[75] Inventor: Dirk Kammermeier, Stein, Germany

[73] Assignee: Kennametal Hertel AG, Furth, Germany

[21] Appl. No.: 727,379

[22] PCT Filed: Apr. 27, 1995

[86] PCT No.: PCT/EP95/01600

§ 371 Date: Oct. 15, 1996

§ 102(e) Date: Oct. 15, 1996

[87] PCT Pub. No.: WO95/29030

PCT Pub. Date: Nov. 2, 1995

[30] Foreign Application Priority Data

Apr. 27, 1994 [DE] Germany .................... 9407222 U

[51] Int. Cl.⁶ .................................................. B23B 51/06
[52] U.S. Cl. ................................................ 408/59; 408/57
[58] Field of Search .................. 408/18, 56, 57, 408/59; 409/136

[56] References Cited

U.S. PATENT DOCUMENTS 4,881,431  11/1989  Bieneck ......................... 408/144

FOREIGN PATENT DOCUMENTS 186067   7/1986  European Pat. Off. .
132105  12/1989  Japan .

OTHER PUBLICATIONS

John Dernoga, "Internal–Cooled Bits", in American Machinist, p. 66, Apr. 2, 1951.

Primary Examiner—Steven C. Bishop
Attorney, Agent, or Firm—John J. Prizzi

[57] ABSTRACT

A rotary drill comprising a shaft of full carbide metal which shaft is to be connected to the driving spindle of a machine tool. The shaft contains helically extending ducts which run adjacent to one another through the shaft, substantially longitudinally, for transporting cooling fluid to the cutting edge of the drill. At least two of the ducts are covered by a common sealing plate adjacent the cutting end of the shaft, with the sealing plate being a distance from the cutting edges of the drill, to create a closed fluid flow path between the ducts to permit dry operation of the drill.

11 Claims, 3 Drawing Sheets

ROTARY TOOL, IN PARTICULAR A DRILL

BACKGROUND OF THE INVENTION

1. Field of the Invention

The invention relates to a drill comprising a shaft, particularly one made of full carbide metal, having cutting edges arranged at the cutting end of the shaft. Additionally, there is a connection area at the outer connecting end of the shaft for connecting with the driving spindle of a machine tool. The shaft has ducts which run parallel to each other through the shaft in a substantially longitudinal direction and open out at the cutting end of the shaft for transporting fluids from the connection end to the cutting edges.

2. Background Information

DE 36 01 385 C2 discloses such a drilling tool. Its helically fluted shaft is preferably made of full carbide metal with an essential characteristic being the helically extending interior ducts for transporting coolant to the cutting edge area at the tip of the drilling tool. The ducts open out at the respective flanks of the cutting edges to bring the coolant to the immediate cutting area and to effect cooling of the drill's cutting edges.

Cooling of the cutting edges presents problems particularly with drilling tools for deep bore holes. Such cooling is especially important in full carbide drills and is effected by cooling lubricants. In metal cutting technology, there is a general trend toward dry operation to avoid the disadvantages of wet operation or wet cutting. These disadvantages include exposure in the work place and problems of waste disposal. However, the high water content of cooling lubricant emulsions can also result in corrosion of the work piece.

An additional problem, particularly with heavy-duty drills and deep bore holes, is meeting their fit accuracy. For this purpose, the drill is provided with tolerance data. With close tolerances, however, tolerance data can guarantee the associated fit accuracy only if there is no excessive temperature rise in the important cutting edge area. Adequate heat removal from the cutting edge area is therefore a basic prerequisite for dry cutting.

It is generally known in cutting technology that the cutting materials silicon nitride and oxide ceramics exhibit a low coefficient of thermal expansion and therefore little sensitivity to heat. Their usability is limited, however, due to the fact that these cutting materials are very brittle. On the other hand, the conventional cutting material, carbide metal, exhibits the disadvantage of increased thermal expansion.

Today, the cutting performance of carbide tools is enhanced by coatings which are particularly effective in the cutting edge region. However, this necessarily results in higher temperatures in the contact zone and correspondingly requires improved heat removal.

Furthermore, JP 1 321 105 discloses a face grinding tool with an approximately tubular shaft, the shaft wall of which is provided with coolant ducts running in axial direction and opening out at the shaft end face. The shaft end openings of two coolant ducts are spatially connected with each other by a ring which is fitted onto the front end of the shaft with a ring groove facing the coolant duct ends to create a coolant loop of a closed coolant circulation system. The end face of this circular ring is fitted with a diamond abrasive body which performs the metal removal with a non-defined cutting edge. The ring which connects the coolant ends with each other is fully admitted to the cutting forces that act on the diamond cutting body. Technically, a grinding process is metal removal with a non-defined cutting edge. As a result, the cutting forces are uniformly distributed over the circumference of the ring and the ring's welded connection with the tubular shaft being able to absorb these uniformly distributed cutting forces. In a drill, by contrast, the cutting forces act on the drill cutting edges which take up a comparatively small part of the drill end face and are therefore usually subject to substantially higher loading than the grinding segments of a face grinding tool.

OBJECT OF THE INVENTION

The object of the invention is to design drills permitting adequate heat removal in the contact zone despite suitability for dry cutting.

SUMMARY OF THE INVENTION

In general, the problem is solved by implanting in the shaft a coolant loop which is brought as close as possible to the contact zone, that is to the cutting edge which traditionally forms part of the shaft, to provide an adequate cooling effect in this critical area. Such a coolant loop is created, that is, the desired change in coolant flow direction within the tool shaft, particularly in the contact zone, is effected by fitting a sealing unit at the outflow ends of the ducts in areas which are not or not substantially stressed by the cutting forces which are effective during operation. The outflow ends are thereby spatially connected with each other and the seal of the outflow ends is such that no coolant can exit.

The spatial connection permitting the flow of coolant between, in particular, two outflow ends which correspond with each other can be achieved in different ways in that either the contact surface of the sealing unit and/or the opposite surface of the front end of the drill shaft is/are fluted between the two outflow ends. If both surfaces are fluted, the grooves correspond to form a common duct.

The sealing unit is appropriately made from a tool steel that exhibits high thermal conductivity.

To complete the coolant circulation system, the coolant loop in the tool body or drill corresponds with an analogous coolant loop in the machine tool—whereby the latter coolant loop includes the tool spindle. Accordingly, the machine tool spindle, in the interface region to the tool, is provided with openings for coolant intake and with a coolant outflow duct.

BRIEF DESCRIPTION OF THE DRAWINGS

The invention is further explained by means of the exemplary embodiments depicted in the drawing figures.

DESCRIPTION OF THE PREFERRED EMBODIMENT

Figure 1:
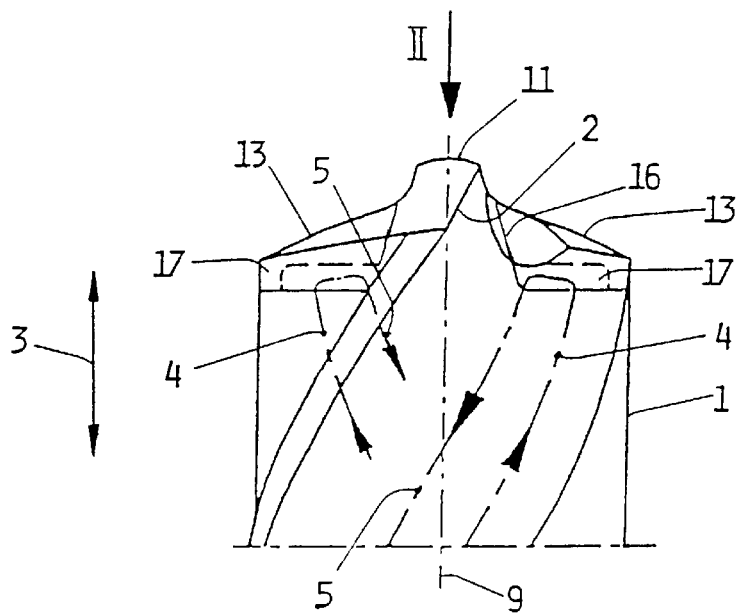
FIG. 1 is a side elevation of a drill tip according to the invention with added sealing units.
Figure 2:
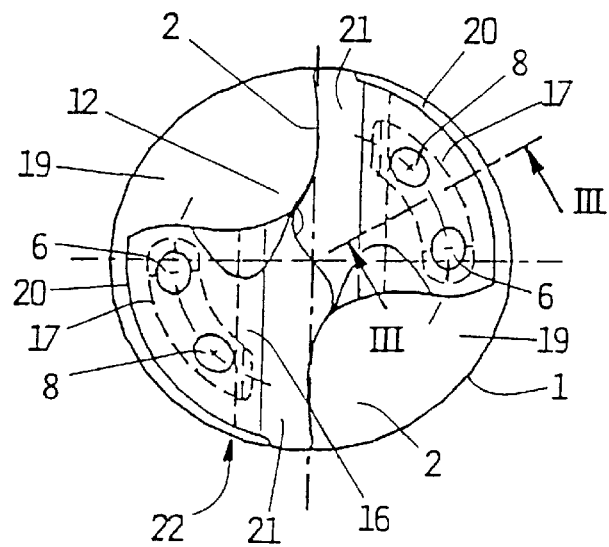
FIG. 2 is a plan view of the drill tip in the direction of arrow II of FIG. 1.
Figure 3:
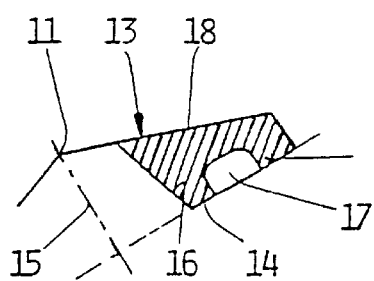
FIG. 3 is a partial section corresponding to section line III—III in FIG. 1.
Figure 4:
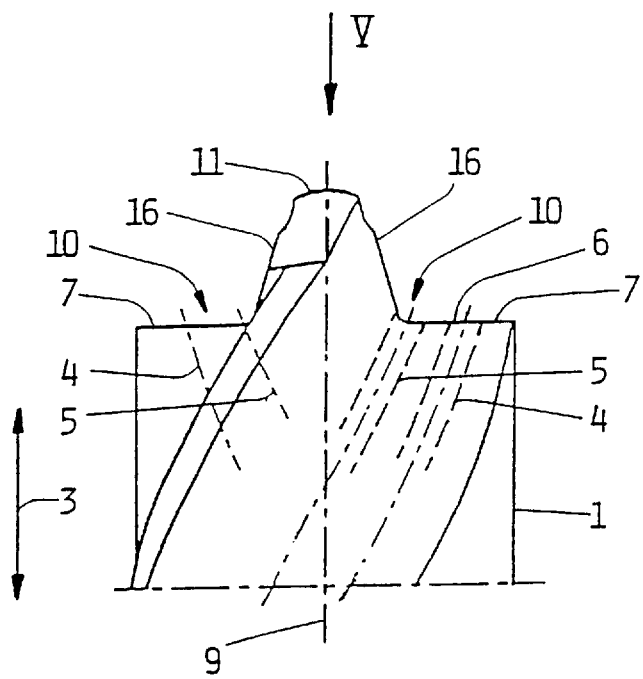
FIG. 4 is a side elevation of the single-piece full carbide drill shaft provided with the cutting edges but without the sealing units.
Figure 5:
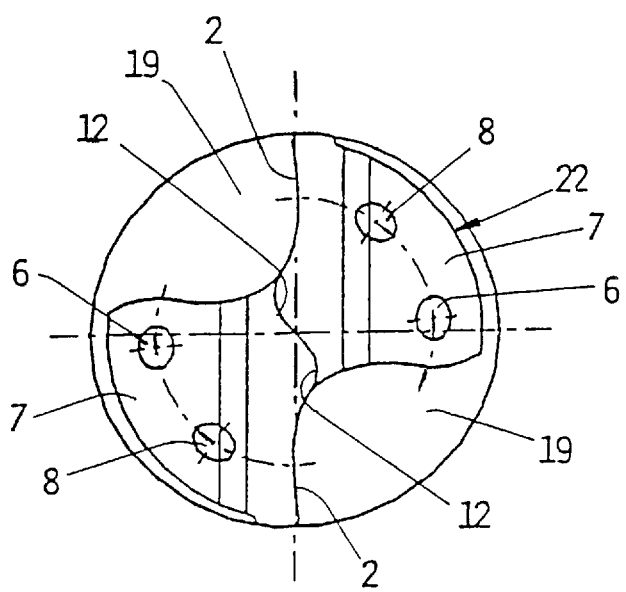
FIG. 5 is a plan view of the shaft tip corresponding to arrow V in FIG. 4.

The drill comprises shaft 1 which is preferably made of carbide metal with cutting edges 2 arranged in the tip area of the shaft. Shaft 1 is provided with ducts 4,5 which run through the shaft in a substantially longitudinal direction 3 and open out at cutting end 7 of shaft 1. Ducts 4,5 with their outflow ends 6,8 open out at the cutting ends. In the area of the outflow ends 6,8 the two cutting ends 7 are formed as planes which, for example, in the present case are at right angles to drill axis 9.

In the drill depicted by way of example, cutting ends 7 form two face segments 10 as front ends of the two shaft ribs between which protrudes, in radial-ridge fashion and in longitudinal direction 3, that part of the drill shaft which together with shaft 1 forms the single-piece drill tip 11 which is provided with two cutting edges 2 and chisel edge 12 located between them.

In the complete drill, the two face segments 10 are substantially covered by sealing units 13. Sealing units 13 with their contact surface 14 lie flush against the faces of face segments 10. In the same manner, their sides 15 facing drill axis 9 touch the opposite sides 16 of drill tip 11 along their entire surface. Sealing units 13 are glued or soldered in the contact area of their contact surfaces 14 or sides 15 with the opposite surfaces of the carbide shaft or the associated drill tip 11. The reason for this permanent connection and full surface contact is the attempt to achieve maximum heat transfer in the contact area between these parts.

Sealing units 13 are provided with grooves 17 in the area of their contact surface to form a connection between outflow ends 6,8 of ducts 4,5. Thus, grooves 17 form a coolant loop with ducts 4,5 as the beginning and the end of the loop. However, analogous grooves can be formed in the end faces of cutting ends 7 or such end face grooves can correspond with grooves 17 of sealing units 13 to form a common duct.

Outer surfaces 18 of sealing units 13 end flush with flank 21 of the adjacent cutting edge 2.

The drill shaft shown in the exemplary embodiments is that of a helically fluted drill and the number of coolant loops corresponds to the number of helical grooves (two in this case) of shaft rib 22 which lies between them. Instead of one single coolant loop between two helical grooves 19, it is also possible to arrange several coolant loops. This option particularly exists with drills having a greater effective diameter. The chip grooves need not be formed as helical flutes. It is irrelevant to the invention if the chip grooves are straight grooves.

In the drill point area, the two sealing units 13 with their outer sides 20 form a part of the outer casing of shaft 1.

On the side facing away from drill tip 11, ducts 4,5 extend all the way to the interface area to the machine tool spindle. Sealing units 13 with their outer surfaces 18 form the part of the drill flanks facing away from the drill cutting edges 12 in a substantially complete manner.

To regrind the drill, the glued or soldered sealing units 13 must be removed. This is easily accomplished by means of heat. This makes it possible to regrind the tip without the sealing units 13 affecting the regrinding operation.

However, depending on the material removal in the area of drill tip 11, the front end 7 or the associated end faces are also ground to restore the former drill tip contours.

Figure 6:
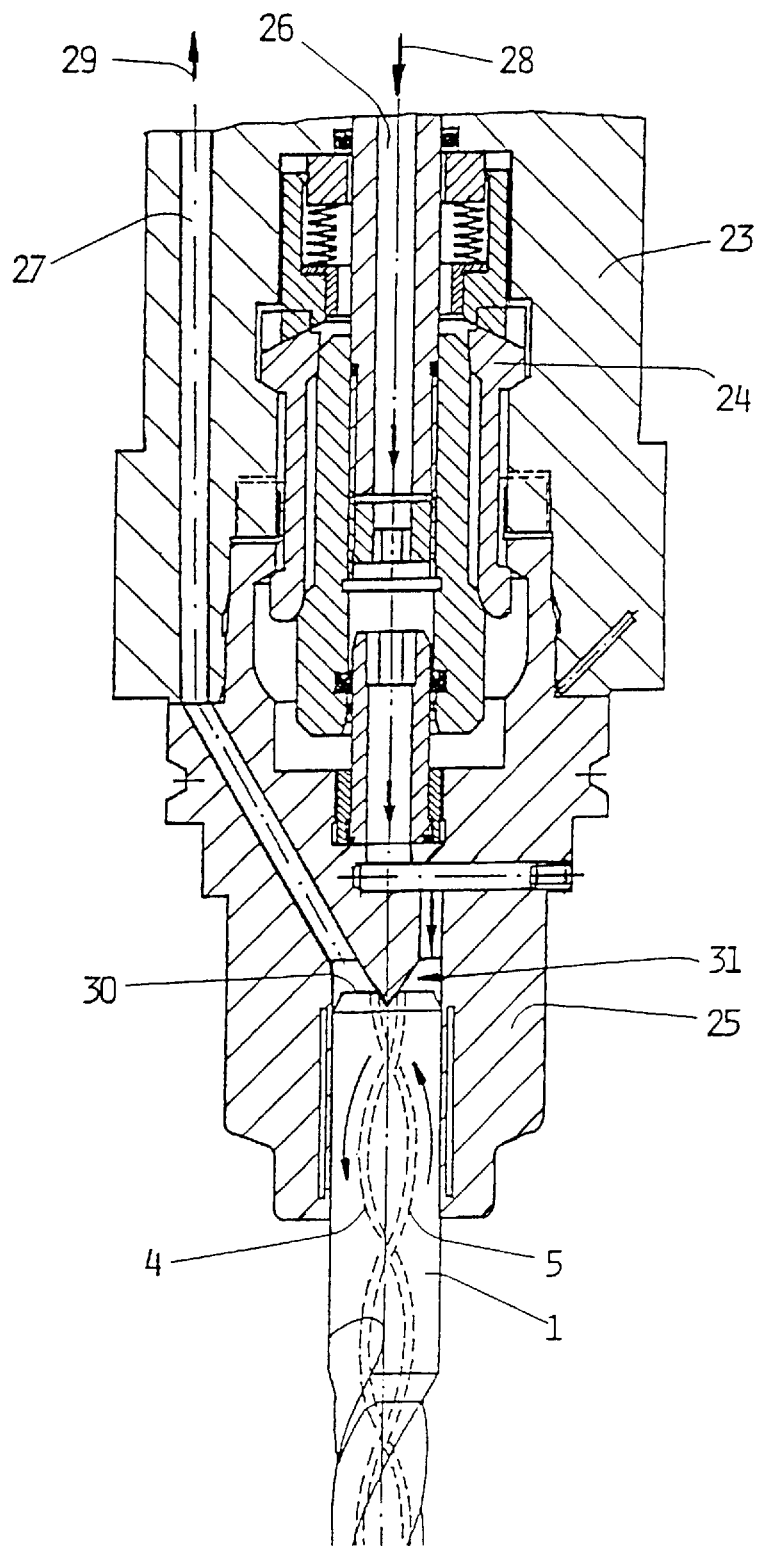
FIG. 6 is a section of a machine tool spindle through the tool interface area.

FIG. 6 shows the tool-side end of driving spindle 23 of a drilling machine with clamping system 24 for a drill provided with coolant ducts according to the invention of which only shaft 1 is depicted here. Drill shaft 1 is clamped into chuck 25. Clamping system 24 which is connected with spindle 23 serves to clamp chuck 25, which is fitted with the drill, to driving spindle 23.

Clamping system 24 and/or spindle 23 are provided with an inflow line 26 and an outflow line 27 for the coolant. The flow directions are indicated by direction arrows 28,29. Inflow line 26 corresponds with inflow duct 4 and outflow line 27 with duct 5 in shaft 1. Ducts 4,5 are depicted only schematically. At least one pair of ducts 4,5 in the drill or in drill shaft 1 is assigned to each cutting edge 2. Ducts 4,5 open out at different areas of machine-side shaft end 30. These areas are separated from each other on the machine side such that coolant inflow 28 and outflow 29 are guided in a closed coolant circulation system which is not interrupted per se. The ends of the coolant circulation system are located above and below the functional area shown in FIG. 6. The one half of the coolant circulation system is located on the machine side, the other half on the tool side, and interface 31 between the two parts of the coolant circulation system is located in the area of shaft end 30.

I claim:

1. A drill comprising:

a shaft (1), particularly one made of full carbide metal;

said shaft having a first end and a second end;

said first end of said shaft being a cutting end;

said second end of said shaft being a outer connecting end of said shaft;

said shaft having an outer periphery;

said cutting end of said shaft comprising a cutting tip for drilling into an object to be drilled;

said tip being centrally disposed on said cutting end of said shaft;

said cutting end comprising at least one fluted surface;

said at least one fluted surface being disposed to extend from substantially adjacent said tip substantially to said periphery of said shaft;

said shaft comprising at least one channel, said at least one channel being configured and disposed to permit drilled material to be transported along at least a substantial portion of said shaft and away from said tip and to permit said material to be ejected from said drill;

cutting edges (2) arranged at said cutting end (7) of said shaft (1);

said cutting edges being disposed to extend from substantially adjacent said tip to at least substantially adjacent said periphery;

a connection area at said outer connecting end of said shaft (1) for connection with the driving spindle of a machine tool;

ducts (4,5) running adjacent to each other through said shaft (1) in substantially longitudinal direction (3) and opening out at said shaft's cutting end (7) for transporting fluids from said connection end to said cutting edges (2); and a number of said ducts (4,5) forming a coolant loop in a closed coolant circulation system, to form at least one duct pair, open out at said cutting end into the flank area of said cutting edge (2) which forms a single piece with said shaft (1) and that the flow ends (6,8) of said duct pair are covered by a common fluid-tight sealing unit (13) which sealing unit is at a distance from the adjacent cutting edges (2) thus creating a fluid opening which spatially connects the flow ends (6,8) with each other.

2. The drill according to claim 1, further comprising:

said sealing unit comprising a supporting surface;

a groove (17) which is formed in the supporting surface (14) of the sealing unit (13); and said groove being disposed and configured to act as a fluid duct between the flow ends (6,8).

3. The drill according to claim 1, further comprising a groove which is formed in the front end (7) of the cutting end of the shaft (1), said groove acts as a fluid connection between the flow ends (6,8).

4. The drill according to claim 3, wherein said grooves correspond with each other to form a fully closed channel.

5. The drill according to claim 1, further comprising an outer surface (18) of said sealing unit (13) ends flush with the flank (21) of the adjacent tool cutting edge (2).

6. The drill according to claim 1, wherein:
said sealing unit comprises side faces, each of said side faces having a surface; and
the side faces (14,15) of the sealing unit (13) lie at least partially against the shaft with their surfaces.

7. The drill according to claim 1, comprising:
a shaft rib;
said shaft rib being disposed to extend between two of said chip grooves; and
at least one pair of ducts (4,5) each runs through said shaft rib (22).

8. The drill according to claim 7, wherein said sealing unit (13) with its circumference forms a part of the outer casing of said shaft rib (22).

9. The drill according to claim 8, wherein said sealing unit (13) is glued or soldered onto the cutting end (7) of shaft rib (22).

10. The drill according to claim 9, wherein said sealing unit (13) is made of a heat-conducting material, particularly from tool steel.

11. The drill according to claim 10, further comprising a machine tool having an other part of the coolant circulation system such that the two parts form a closed coolant circulation system upon corresponding connection of the flow ends facing each other.

* * * * *